United States Patent
Oka

(10) Patent No.: US 9,019,314 B2
(45) Date of Patent: Apr. 28, 2015

(54) IMAGE GENERATION APPARATUS, CONTROL METHOD THEREOF, AND RECORDING MEDIUM

(75) Inventor: Hiroto Oka, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 13/464,381

(22) Filed: May 4, 2012

(65) Prior Publication Data

US 2012/0287161 A1 Nov. 15, 2012

(30) Foreign Application Priority Data

May 11, 2011 (JP) ................. 2011-106621

(51) Int. Cl.
*G09G 5/00* (2006.01)
*G06F 17/30* (2006.01)
*G06T 11/60* (2006.01)
*H04N 1/32* (2006.01)

(52) U.S. Cl.
CPC ............ *G09G 5/00* (2013.01); *G09G 2340/045* (2013.01); *G09G 2340/0464* (2013.01); *G09G 2340/12* (2013.01); *G09G 2340/14* (2013.01); *G06F 17/30274* (2013.01); *G06F 17/30265* (2013.01); *G06T 11/60* (2013.01); *H04N 1/32128* (2013.01); *H04N 2201/3253* (2013.01)

(58) Field of Classification Search
CPC ............. G09G 2340/0407; G09G 2340/0414; G09G 2340/0421; G06T 3/40; G06F 3/0481
USPC .......... 345/660, 666, 667, 671; 701/409, 454, 701/455
See application file for complete search history.

(56) References Cited

U.S. PATENT DOCUMENTS

| | | | |
|---|---|---|---|
| 2006/0142942 A1* | 6/2006 | Pyo ................................. | 701/211 |
| 2007/0271235 A1* | 11/2007 | Frank et al. ........................ | 707/3 |
| 2008/0133462 A1* | 6/2008 | Aylward et al. ................... | 707/2 |
| 2008/0228754 A1* | 9/2008 | Frank et al. ........................ | 707/5 |
| 2009/0327229 A1* | 12/2009 | O'Connor et al. ................ | 707/3 |
| 2010/0153386 A1* | 6/2010 | Tysowski ........................ | 707/736 |
| 2011/0085057 A1* | 4/2011 | Takahashi .................. | 348/231.3 |
| 2012/0141046 A1* | 6/2012 | Chen et al. ..................... | 382/282 |

FOREIGN PATENT DOCUMENTS

JP 2010-066972 A 3/2010

* cited by examiner

*Primary Examiner* — Xiao M. Wu
*Assistant Examiner* — Todd Buttram
(74) *Attorney, Agent, or Firm* — Carter, DeLuca, Farrell & Schmidt, LLP

(57) ABSTRACT

At the first scale size, a predetermined first arrangement position is determined as the arrangement position of an image to be arranged on a map. At the second scale size larger than the first scale size, the second arrangement position closer to the shooting location of the image than at a position corresponding to the first arrangement position on the map at the second scale size is determined as the arrangement position.

14 Claims, 6 Drawing Sheets

IMAGE GENERATION APPARATUS, CONTROL METHOD THEREOF, AND RECORDING MEDIUM

BACKGROUND OF THE INVENTION

1. Field of the Invention

The present invention relates to a display technique for an image arranged on a map.

2. Description of the Related Art

Recently, some image capturing apparatuses such as a digital camera include a position detection unit such as a GPS unit. When image data is captured, position information acquired by the position detection unit is set as position information (so-called geotag) of the shooting location in header information of image data or the like. Image data containing information of a shooting location (to be referred to as image data) can be arranged and displayed at a position corresponding to the shooting location on a map using position information of the shooting location. The shooting location of the image data can be intuitively presented to the user.

However, when arranging and displaying image data on a map, if there are a plurality of image data captured at the same shooting location, these image data overlap each other, making the display difficult to see. In some cases, arranged image data occludes a landmark such as the name or shape of a building on a map, and the user cannot grasp shooting location information. To solve this, there is a technique capable of changing, to an arbitrary position set by a user, image data once arranged on a map in accordance with shooting location information held in image data. For example, Japanese Patent Laid-Open No. 2010-66972 discloses a technique capable of changing the position of image data arranged on a map. In this technique, information of the arrangement position of image data on a map is stored as position information on an actual map, sharing the arrangement position of the image data on the map between a plurality of users.

However, in the technique of Japanese Patent Laid-Open No. 2010-66972, information of the arrangement position of image data on a map is shared for only a scale size of the map at which the arrangement position has been changed. When another user views the map at another scale size, the scale size may be changed to one at which the arrangement position has been changed.

The arrangement position of image data on a map is stored as position information on an actual map because the map is scrolled, as described above. If image data is arranged using position information on the actual map upon a change of the scale size, the following case may occur. For example, when the scale size of a map is greatly changed, image data arranged near a shooting location on the map at a scale size before the change is displayed at a position spaced apart from the shooting location upon the change of the scale size. As a result, the user may not be able to find out or view the image data captured at the shooting location for the purpose of viewing upon the change of the scale size of the map.

To prevent this, image data may contain information of arrangement positions on a map for all scale sizes provided by the map. However, for example, the arrangement position of image data may change depending on the scale size, and the user may be confused. When a change of an arrangement position at one scale size is to be reflected on other scale sizes, the arrangement position needs to be recalculated for all scale sizes. Further, storing information of arrangement positions on a map for all the scale sizes of the map in image data increases the image data size and is not practical.

SUMMARY OF THE INVENTION

The present invention has been made to solve the problems of the conventional techniques. The present invention provides a method of arranging an image at an appropriate position on a map in correspondence with a change of the scale size of the map.

The present invention in its first aspect provides an image processing apparatus including a display unit configured to arrange and display an image on a map, comprising: a change unit configured to change a scale size of the map; and a determination unit configured to determine an arrangement position on the map on which the image is arranged, wherein as the arrangement position of the image, the determination unit determines a predetermined first arrangement position at a first scale size, and at a second scale size larger than the first scale size, determines a second arrangement position closer to a shooting location of the image than at a position corresponding to the first arrangement position on the map at the second scale size.

Further features of the present invention will become apparent from the following description of exemplary embodiments (with reference to the attached drawings).

DESCRIPTION OF THE EMBODIMENTS

Preferred embodiments of the present invention will now be described in detail with reference to the accompanying drawings. The following embodiment will explain an example in which the present invention is applied to, as an example of an image processing apparatus, a PC capable of arranging image data at a corresponding position on a map in accordance with position information of a shooting location held in the image data. However, the present invention is applicable to an arbitrary device capable of arranging image data at a corresponding position on a map in accordance with position information held in the image data.

(Arrangement of PC 100)

Figure 1:
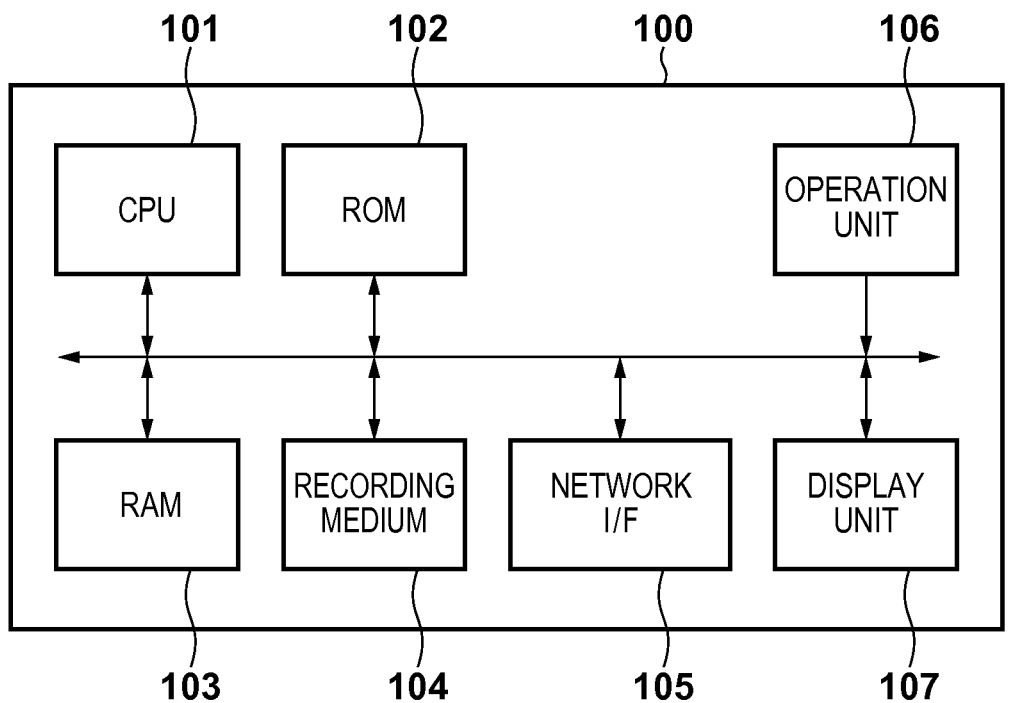
FIG. 1 is a block diagram showing the functional arrangement of a PC 100 according to an embodiment of the present invention.

FIG. 1 is a block diagram showing the functional arrangement of a PC 100 according to the embodiment of the present invention.

A CPU 101 is a block which controls the operation of each block of the PC 100. The CPU 101 controls the operation of each block of the PC 100 by, for example, expanding, in a RAM 103, the programs of image arrangement position storage processing and image arrangement position correction processing (to be described later) stored in a ROM 102, and executing them.

The ROM 102 is a rewritable non-volatile memory. In addition to the program of image arrangement position correction processing, the ROM 102 stores parameters and the like necessary for the operation of each block of the PC 100.

The RAM 103 is a volatile memory. The RAM 103 is used not only as an area for expanding the programs of image arrangement position storage processing and image arrangement position correction processing, but also as a temporary storage area for data and information output by the operation of each block of the PC 100.

In the embodiment, each block arranged as a hardware component in the PC 100 implements processing. However, the practice of the present invention is not limited to this, and processing by each block may be implemented by a program which performs the same processing as that by the block.

A recording medium 104 is a recording device such as the internal memory of the PC 100, or a memory card or HDD detachably connected to the PC 100. The recording medium 104 is used as a database for managing maps and image data. The program of image arrangement position correction processing (to be described later) may be recorded as an application on the recording medium 104.

A network I/F 105 is an interface for connecting the PC 100 to an external apparatus via a wire or wirelessly. The network I/F 105 receives image data from, for example, a connected digital camera (not shown). The PC 100 may be connected to a server on a network such as the Internet via the network I/F 105 and receive map data.

An operation unit 106 is a user interface of the PC 100 that accepts an input from the user, such as a keyboard or mouse. The operation unit 106 transmits, to the CPU 101, a control signal corresponding to an operation by the user.

A display unit 107 is a display device such as a liquid crystal display connected to the PC 100. In the embodiment, the display unit 107 displays image data containing a map generated by at least image arrangement position correction processing.

(File Structure of Image File)

An image file containing image data to be arranged on a map in the embodiment will be explained with reference to FIG. 2.

Figure 2:
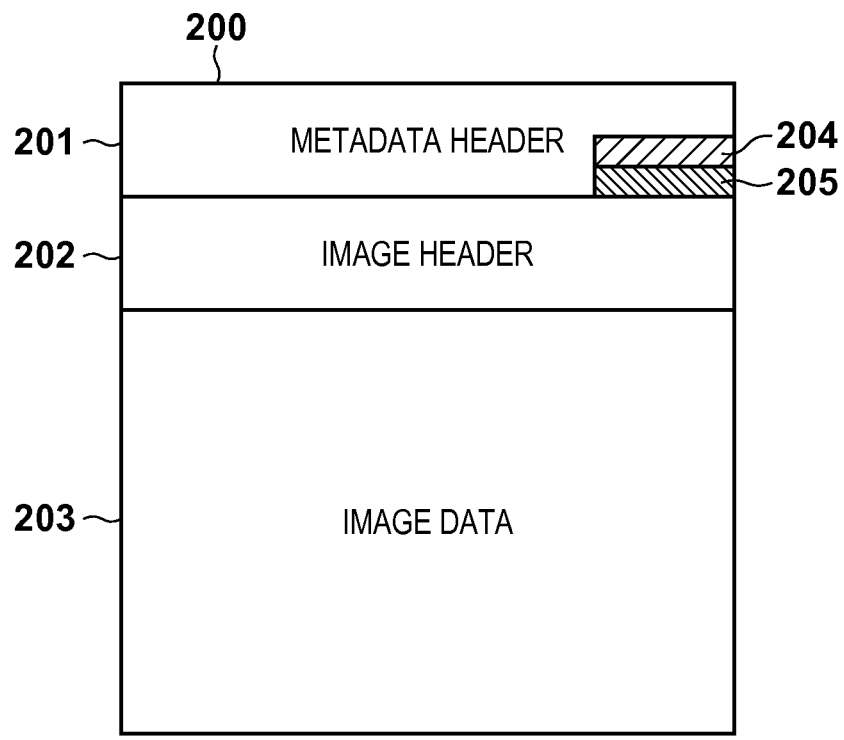
FIG. 2 is a view showing the file structure of an image file according to the embodiment of the present invention.

Image data 203 to be arranged on a map is recorded on the recording medium 104 as an image file having a file structure as shown in FIG. 2. An image file 200 is formed from a metadata header 201, an image header 202, and the image data 203. The image file 200 corresponds to one image data.

The metadata header 201 is a header area where metadata regarding the image file 200 is stored. In the embodiment, the area of shooting location position information 204 in the metadata header 201 contains position information of a shooting location where the image data 203 in the image file 200 was captured. More specifically, the metadata header 201 is defined by the Exif specification or the like. In addition to the shooting location position information 204, the metadata header 201 contains digital camera setting parameters in shooting such as the shooting date & time, focal length, and zoom ratio, and an image search keyword or comment.

The embodiment assumes that the metadata header 201 stores, as arrangement position information 205, information of the arrangement position of the image data 203 on a map that has been changed by the user, and a scale size on the map upon the change. When the arrangement position information 205 exists in the metadata header 201, the image data 203 is arranged at a corresponding position on the map not using the shooting location position information 204 but using the arrangement position information 205.

In the following description, the shooting location position information 204 and arrangement position information 205 are position information of the digital camera which has captured the image data 203 that is obtained by a GPS unit, and information of a display position on a map, respectively. These pieces of information are described in the form of the longitude and latitude.

The image header 202 is a header area where information necessary to decode the image data 203 is stored. For example, when the image data 203 is image data encoded in the JPEG encoding format, this area stores a thumbnail image generated by scaling down the image data 203.

(Example of Interface of Image Arrangement Position Change Application)

The embodiment will explain an application which arranges image data on a map in accordance with the shooting location position information 204 held in the image data, and allows the user to change the layout of the image data.

Figure 3:
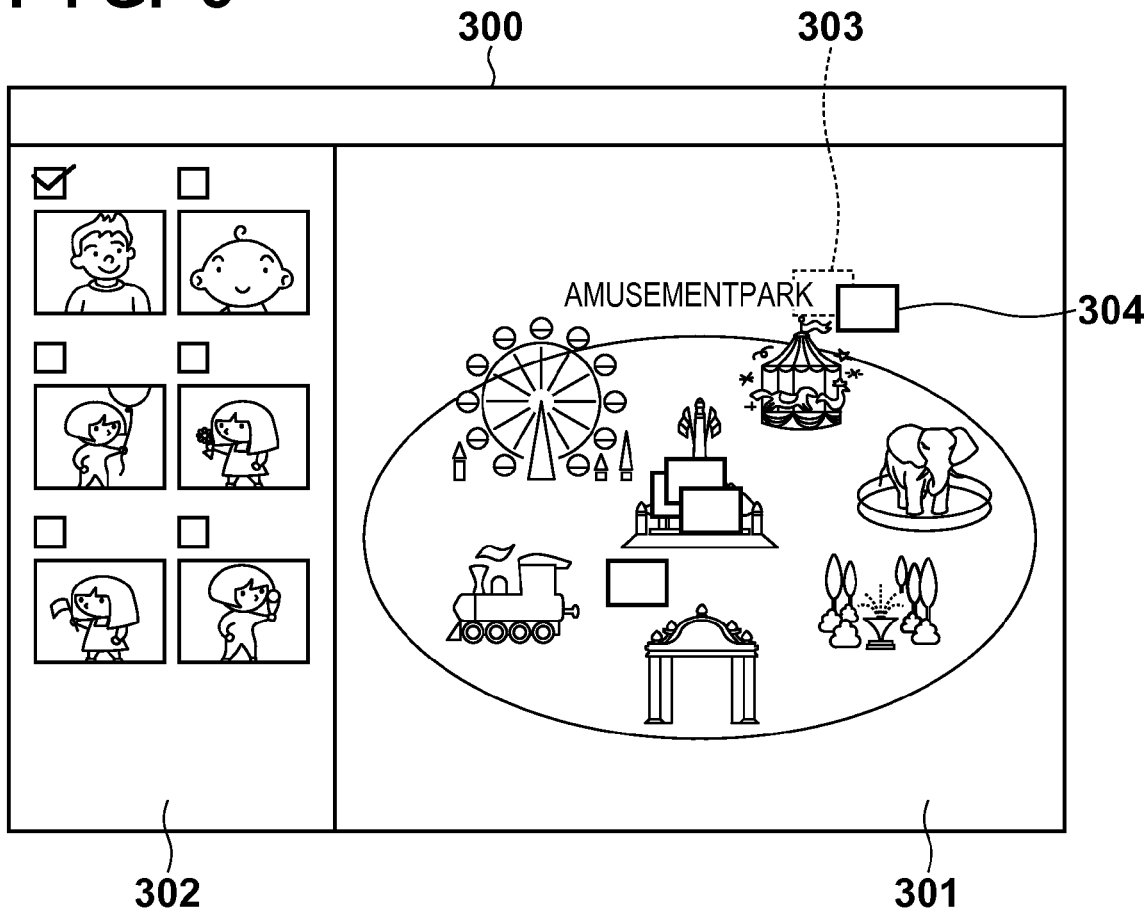
FIG. 3 is a view exemplifying the interface of an image arrangement position change application according to the embodiment of the present invention.

FIG. 3 shows the GUI of an image arrangement position change application that is displayed on the display unit 107. In FIG. 3, an application window 300 displays a map display region 301, and a selection region 302 for image data to be arranged.

A plurality of images are displayed in the selection region 302, and the thumbnail image of an image checked in the check box is arranged on a map in the map display region 301. A position on the map where the image checked in the check box is arranged is determined in accordance with the shooting location position information 204 or arrangement position information 205.

By using "expressions for calculating plane rectangular coordinates x and y and a meridian convergence angle from a latitude and longitude" put on the homepage of Geographical Survey Institute (http://vldb.gsi.go.jp/sokuchi/surveycalc/algorithm/b12xy/b12xy.htm), x- and y-coordinates on the map that correspond to a latitude $\phi$ and longitude $\lambda$ are given by $$\cdot x\text{-coordinate} \tag{1}$$

$$x = \left\{ (S - S_0) + \frac{1}{2} N \cos^2 \varphi \cdot t \cdot (\Delta \lambda)^2 + \right.$$

$$\frac{1}{24} N \cos^4 \varphi \cdot t(5 - t^2 + 9\eta^2 + 4\eta^4)(\Delta \lambda)^4 -$$

$$\frac{1}{720} N \cos^6 \varphi \cdot t(-61 + 48t^2 - t^4 - 270\eta^2 + 330t^2\eta^2)(\Delta \lambda)^6 -$$

$$\left. \frac{1}{40320} N \cos^8 \varphi \cdot t(-1385 + 3111t^2 - 543t^4 + t^6)(\Delta \lambda)^8 \right\} \cdot m_0$$

-continued

· y-coordinate (2)

$$y = \left\{ N\cos\varphi \cdot \Delta\lambda + \frac{1}{6}N\cos^3\varphi(-1+t^2-\eta^2)(\Delta\lambda)^3 - \right.$$
$$\frac{1}{120}N\cos^5\varphi(-5+18t^2-t^4-14\eta^2+58t^2\eta^2)(\Delta\lambda)^5 -$$
$$\left. \frac{1}{5040}N\cos^7\varphi(-61+479t^2-179t^4+t^6)(\Delta\lambda)^7 \right\} \cdot m_0$$

where
$\Delta\lambda=\lambda-\lambda_0$ (east is set positive)
$\eta^2=e'^2\cos^2\varphi$
$t=\tan\varphi$ Note that the parameters in equations are as follows:
$\lambda_0$: longitude of the origin of the coordinate system
$m_0$: scale factor at the origin of the coordinate system ($m_0=0.9999$)
$S_0$: meridional part from the equator to the latitude $\varphi_0$ of the origin of the coordinate system
$S$: meridional part from the equator to the latitude $\varphi$
$N$: curvature radius of the prime vertical
$e'$: minor eccentricity As described above, an image which is arranged on the map in the map display region 301 and has the shooting location position information 204 allows the user to change its position on the map by, for example, a drag operation using the mouse. For example, when an image 303 is displayed and occludes a character string which is contained in the map and represents a place name, the user can move the image 303 to a position 304 where the image 303 does not occlude the place name. At this time, information of the latitude $\varphi$ and longitude $\lambda$ corresponding to the arrangement position (plane rectangular coordinates x and y) of the image in the map display region 301 is stored as the arrangement position information 205 together with a scale size of the map that is set in the metadata header 201 of the image file of the image.

By using "expressions for calculating a latitude and longitude and a meridian convergence angle from plane rectangular coordinates x and y" put on the homepage of Geographical Survey Institute (http://vldb.gsi.go.jp/sokuchi/surveycalc/algorithm/xy2bl/xy2bl.htm), a latitude $\varphi$ and longitude $\lambda$ corresponding to plane rectangular coordinates x and y on a map are given by · latitude $\phi$ (3)

$$\varphi = \varphi_1 - \frac{1}{2}\frac{1}{N_1^2}t_1(1+\eta_1^2)\left(\frac{y}{m_0}\right)^2 +$$
$$\frac{1}{24}\frac{1}{N_1^4}t_1(5+3t_1^2+6\eta_1^2-6t_1^2\eta_1^2-3\eta_1^4-9t_1^2\eta_1^4)\left(\frac{y}{m_0}\right)^4 -$$
$$\frac{1}{720}\frac{1}{N_1^6}t_1(61+90t_1^2+45t_1^4+107\eta_1^2-162t_1^2\eta_1^2-45t_1^4\eta_1^2)\left(\frac{y}{m_0}\right)^6 +$$
$$\frac{1}{40320}\frac{1}{N_1^8}t_1(1385+3633t_1^2+4095t_1^4+1575t_1^6)\left(\frac{y}{m_0}\right)^8$$

· longitude $\lambda$ (4)
$\lambda = \lambda_0 + \Delta\lambda$ $$\Delta\lambda = \frac{1}{N_1\cos\varphi_1}\left(\frac{y}{m_0}\right) - \frac{1}{6}\frac{1}{N_1^3\cos\varphi_1}(1+2t_1^2+\eta_1^2)\left(\frac{y}{m_0}\right)^3 +$$
$$\frac{1}{120}\frac{1}{N_1^5\cos\varphi_1}(5+28t_1^2+24t_1^4+6\eta_1^2-8t_1^2\eta_1^2)\left(\frac{y}{m_0}\right)^5 -$$
$$\frac{1}{5040}\frac{1}{N_1^7\cos\varphi_1}(61+662t_1^2+1320t_1^4+720t_1^6)\left(\frac{y}{m_0}\right)^7$$

where
$\eta_1^2=e'^2\cos^2\varphi_1$
$t_1=\tan\varphi_1$
$\Delta\lambda=\lambda-\lambda_0$ (east is set positive)

Note that the parameters in equations are as follows:
$\lambda_0$: longitude of the origin of the coordinate system
$m_0$: scale factor at the origin of the coordinate system ($m_0=0.9999$)
$\varphi_1$: latitude of the foot of a perpendicular dropped from a point in the coordinate system (x, y) to the standard meridian
x: x-coordinate
y: y-coordinate
$N_1$: curvature radius of the prime vertical (argument is ($\varphi_{1b}$))
$e'$: minor eccentricity In the embodiment, information of a latitude and longitude corresponding to the arrangement position of each image on a map is stored as the arrangement position information 205 in the metadata header 201 of an image file containing the image. However, the practice of the present invention is not limited to this. For example, information of a latitude and longitude corresponding to the arrangement position of each image on a map may be stored in the ROM 102, RAM 103, or recording medium 104 in association with the image.

Considering a scroll operation on a map, information of the arrangement position of each image on the map is preferably stored as a latitude and longitude. However, this information suffices to be information capable of uniquely defining the position on the map at different scale sizes. The arrangement position information 205 may be formed from information of a latitude and longitude corresponding to the upper left coordinates or origin of the map display region 301, the coordinates of the arrangement position of an image in the map display region 301, and the scale size of the map. Alternatively, the arrangement position information 205 may be formed as the coordinates of the geocentric coordinate system (coordinate system defined by the X-, Y-, and Z-axes using the gravity of the earth as an origin).

(Image Arrangement Position Storage Processing)

Figure 4:
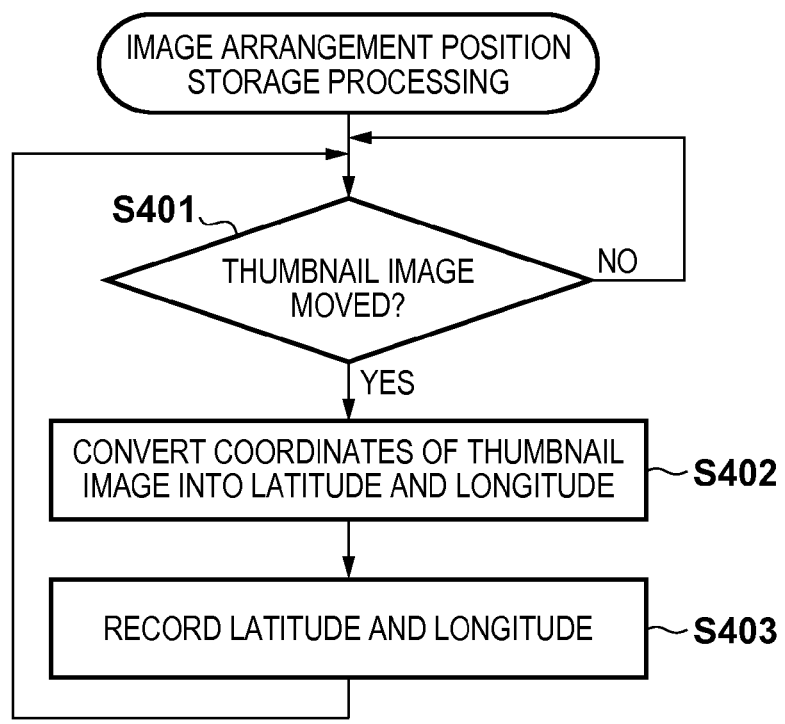
FIG. 4 is a flowchart showing image arrangement position storage processing according to the embodiment of the present invention.

Image arrangement position storage processing by the PC 100 having the above arrangement according to the embodiment will be explained in detail with reference to the flowchart of FIG. 4. Processing corresponding to this flowchart can be implemented by, for example, reading out a corresponding processing program stored in the ROM 102 or recording medium 104, expanding it in the RAM 103, and executing it by the CPU 101. In the following description, the image arrangement position storage processing starts when, for example, the above-mentioned image arrangement position change application is activated by a user operation.

In step S401, the CPU 101 determines whether the user has moved a thumbnail image arranged on a map. More specifically, when the input start coordinates of a drag operation received from the operation unit 106 indicate the position of the thumbnail image arranged in the map display region 301 and the input end coordinates are different from the input start coordinates, the CPU 101 determines that the user has moved the thumbnail image. If the CPU 101 determines that the user has moved the thumbnail image arranged on the map, it shifts the process to step S402. If the CPU 101 determines that the user has not moved the thumbnail image, it repeats the processing of this step.

In step S402, the CPU 101 converts, into information of a latitude and longitude using the above-described equations (3) and (4), the coordinates of the thumbnail image arranged on the map after the movement that have been received from the operation unit 106.

In step S403, the CPU 101 stores, as the arrangement position information 205 in the metadata header 201 of an image file, the information of the latitude and longitude corresponding to the arrangement position of the thumbnail image that has been obtained by the conversion in step S402, and information of a currently set scale size. Then, the CPU 101 returns the process to step S401 again.

By this processing, the user can move the image arranged on the map to an arbitrary position in accordance with the shooting location position information. Information of the arrangement position on the map after the movement can also be stored and added as information of the latitude and longitude. When it is designated to arrange the image again, the image can be arranged at the same position on the map at the same scale size.

The embodiment assumes that the image arrangement position change application allows sharing image data which is set by the user to be displayed on a map, and information of the arrangement position of the image data. More specifically, the user can use a map viewing application (to be described later) to provide another user with a map on which image data is associated with a position pertaining to a shooting location on the map.

(Example of Interface of Map Viewing Application)

Figure 5:
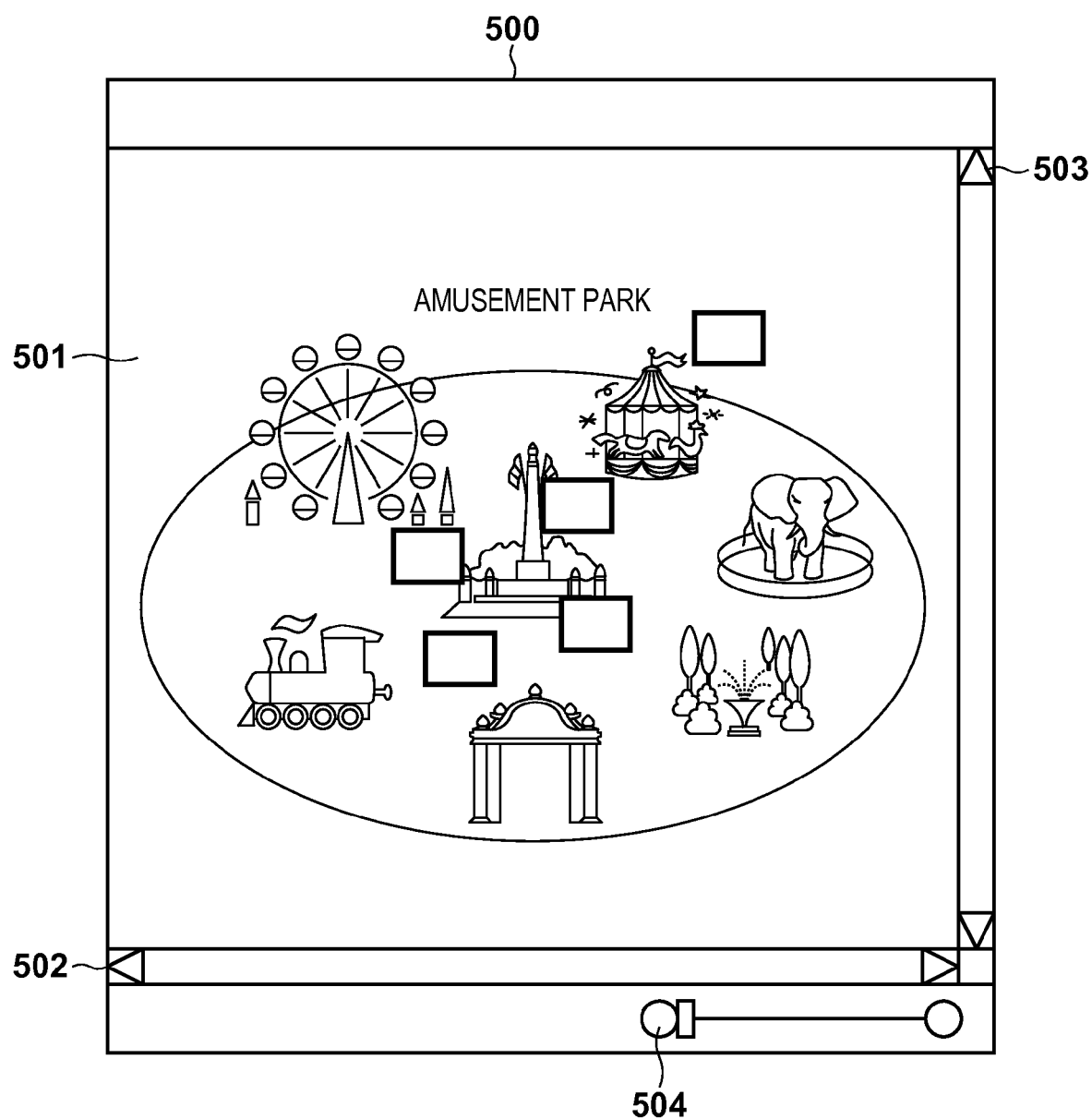
FIG. 5 is a view exemplifying the interface of a map viewing application according to the embodiment of the present invention.

FIG. 5 shows the GUI of the map viewing application that is displayed on the display unit 107. In the embodiment, the image arrangement position change application for editing the position of image data on a map, and the map viewing application for viewing an edited map will be explained as different applications. However, one application may perform these processes. More specifically, an image generation apparatus on a network may execute the image arrangement position change application, and the PC 100 may execute the map viewing application using information of the arrangement position of an image that is determined by the image generation apparatus.

An application window 500 shown in FIG. 5 includes a map display region 501, map scroll bars 502 and 503, and a scale size change bar 504. The map display region 501 displays a map on which a thumbnail image whose arrangement position has been edited after the thumbnail image is selected to be arranged in the image arrangement position change application is arranged.

Figure 6A:
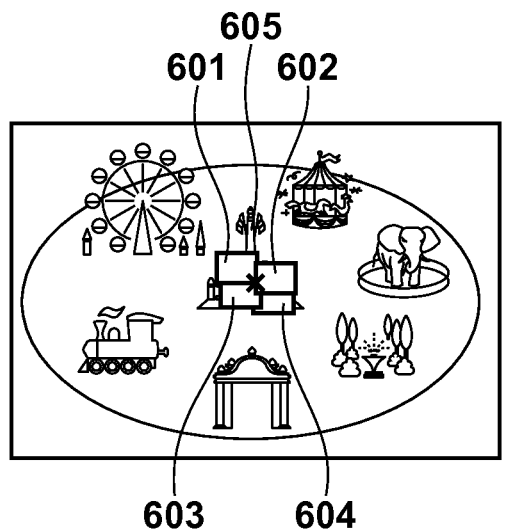
FIGS. 6A, 6B, 6C, and 6D are views for explaining an outline of the image arrangement according to the embodiment of the present invention.
Figure 6B:
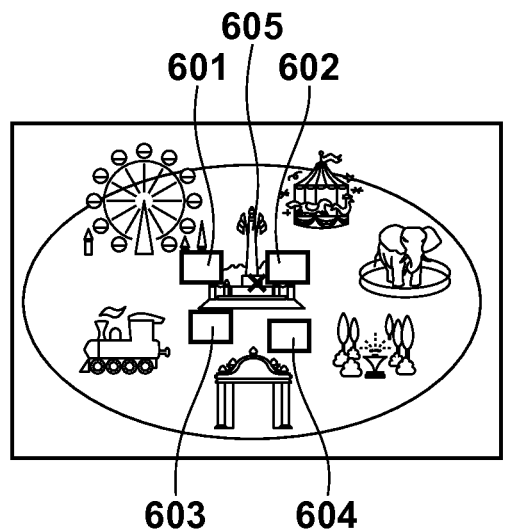

A case in which thumbnail images 601, 602, 603, and 604 are arranged based on the shooting location position information 204 of the metadata header 201 of an image file containing these thumbnail images, as shown in FIG. 6A, will be examined. Assume that the user has changed the arrangement positions of the thumbnail images using the image arrangement position change application, as shown in FIG. 6B, because the displayed thumbnail images occlude a tower 605 serving as a landmark.

Figure 6C:
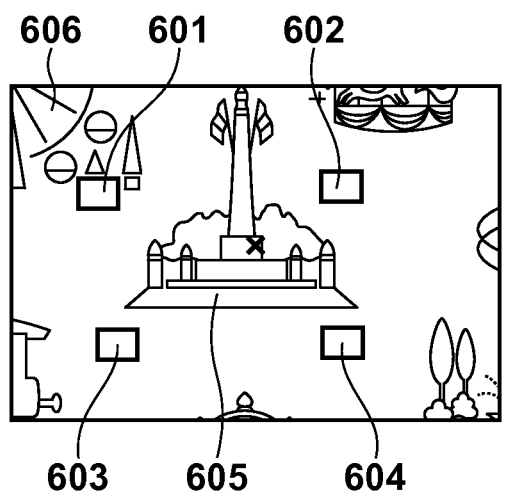

The map viewing application presents, to the user, the map on which the arrangement position-changed thumbnail images 601 to 604 are arranged. In this case, if the user scales up the map by operating the scale size change bar 504, the map is changed as shown in FIG. 6C. This is because, when displaying the thumbnail images on the map, they are arranged on the map using the arrangement position information 205 serving as information of latitudes and longitudes corresponding to the arrangement positions changed by the image arrangement position change application. As the scale size is increased (scaled up), the distance on the map that is defined by a latitude and longitude serving as shooting location position information, and information of a latitude and longitude corresponding to the changed arrangement position increases.

In this case, the thumbnail image 601 which should be arranged near the tower 605 serving as the shooting location is arranged not near the tower 605 but near a Ferris wheel 606, as shown in FIG. 6C. The user neither grasps nor understands the correspondence between the shooting location and the thumbnail image, and is confused.

Figure 6D:
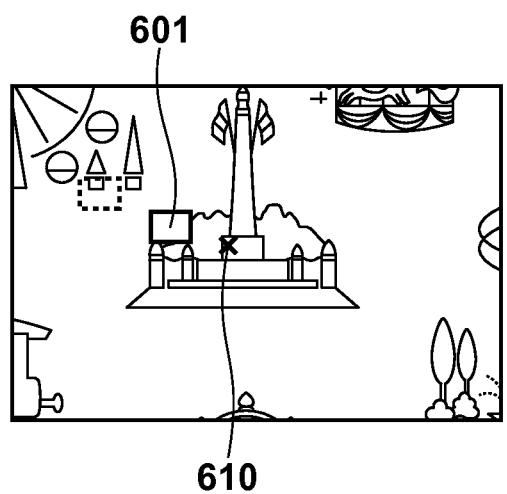

The embodiment prevents misunderstanding of the correspondence between a shooting location and a thumbnail image owing to the scale size of a map. For example, the thumbnail image 601 is corrected to an arrangement position as shown in FIG. 6D by the following image arrangement position correction processing.

(Image Arrangement Position Correction Processing)

Figure 7:
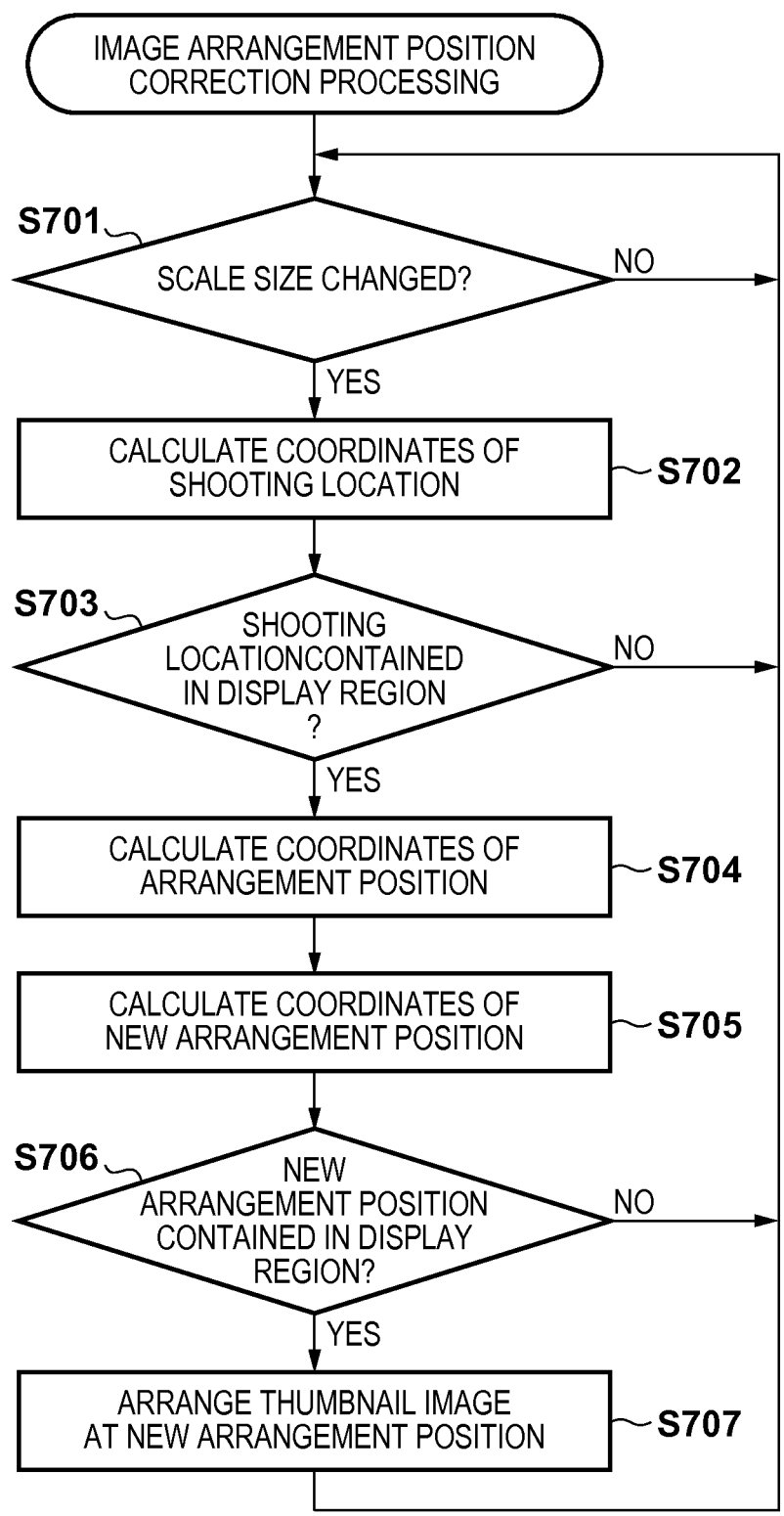
FIG. 7 is a flowchart showing image arrangement position correction processing according to the embodiment of the present invention.

Image arrangement position correction processing by the PC 100 having the above arrangement according to the embodiment will be explained in detail with reference to the flowchart of FIG. 7. Processing corresponding to this flowchart can be implemented by, for example, reading out a corresponding processing program stored in the ROM 102 or recording medium 104, expanding it in the RAM 103, and executing it by the CPU 101. In the following description, the image arrangement position correction processing starts when, for example, the above-mentioned map viewing application is activated by a user operation. For descriptive convenience, a case in which one thumbnail image (thumbnail image 601) is arranged on the map will be explained. However, it will be easily understood that the practice of the present invention is not limited to this.

In step S701, the CPU 101 determines whether the user has changed the scale size of the map. More specifically, the CPU 101 determines whether an operation received from the operation unit 106 that has detected an operation input from the user is the change operation of the scale size change bar 504. If the CPU 101 determines that the user has changed the scale size of the map, it shifts the process to step S702. If the CPU 101 determines that the user has not changed the scale size of the map, it repeats the processing of this step.

In step S702, the CPU 101 calculates the position of the shooting location of the image on the map by referring to the shooting location position information 204 in the metadata header 201 of the image file 200 containing a thumbnail image to be arranged. More specifically, the CPU 101 calculates the coordinates $(x_1, y_1)$ of the shooting location on the map by using the above-described equations (1) and (2) based on information of the latitude and longitude of the shooting location that is contained in the shooting location position information 204.

In step S703, the CPU 101 determines whether the shooting location of the thumbnail image to be arranged is contained in the map after the change of the scale size that is displayed in the map display region 501. More specifically, the CPU 101 determines whether the x- and y-coordinates of the shooting location on the map that have been calculated in step S702 fall within the x-coordinate range and y-coordinate range representing the display range of the map display region 501. If the CPU 101 determines that the shooting location of the thumbnail image to be arranged is contained in the displayed map after the change of the scale size, it shifts the process to step S704. If the CPU 101 determines that the shooting location of the thumbnail image to be arranged is not contained in the displayed map after the change of the scale size, it returns the process to step S701 without arranging the thumbnail image on the map.

In step S704, the CPU 101 calculates the coordinates of the arrangement position set on the map for the image by referring to the arrangement position information 205 in the metadata header 201 of the image file 200 containing a thumbnail image to be arranged. More specifically, the CPU 101 calculates the coordinates $(x_2, y_2)$ of the arrangement position on the map by using the above-described equations (1) and (2) based on information of the latitude and longitude of the arrangement position that is contained in the arrangement position information 205.

As described above, on a map after a change of the scale size, the correspondence between an arrangement position set at a different scale size and the shooting location on the map before change of the scale size, that is, the distance between the shooting location and the arrangement position on the map is changed. For this purpose, in step S705, the CPU 101 calculates a new arrangement position on the map after the change of the scale size so as to hold the correspondence between the shooting location and the arrangement position set at a different scale size on the map at a scale size before the change.

More specifically, a new arrangement position $(x_2', y_2')$ is given by $$x_2' = n(x_1 - x_0) + (1-n)(x_2 - x_0) + x_0 \quad (5)$$

$$y_2' = n(y_1 - y_0) + (1-n)(y_2 - y_0) + y_0 \quad (6)$$

where $$n = 1 - \frac{m}{m'}\alpha$$

$\alpha$ is a constant which satisfies $0<\alpha<1$, or satisfies a function: $\alpha = f\{(x_1-x_0)^2 + (y_1-y_0)^2\}$ ($0<f<1$). Note that the parameters in equations are as follows:

m: scale size before a change of the scale size
m': scale size after a change of the scale size
$x_0$: x-coordinate of the origin of the map in the map display region 501
$y_0$: y-coordinate of the origin of the map in the map display region 501

In step S706, the CPU 101 determines whether the new arrangement position of the thumbnail image to be arranged is contained in the map after the change of the scale size that is displayed in the map display region 501. More specifically, the CPU 101 determines whether the x- and y-coordinates of the new arrangement position on the map that have been calculated in step S705 fall within the x-coordinate range and y-coordinate range representing the display range of the map display region 501. If the CPU 101 determines that the new arrangement position of the thumbnail image to be arranged is contained in the displayed map after the change of the scale size, it shifts the process to step S707. If the CPU 101 determines that the new arrangement position of the thumbnail image to be arranged is not contained in the displayed map after the change of the scale size, it returns the process to step S701 without arranging the thumbnail image on the map.

In step S707, the CPU 101 causes a GPU (not shown) to generate, for the map rendered in the map display region 501, an image in which the thumbnail image is arranged at the new arrangement position on the map that has been calculated in step S705. The CPU 101 further causes the operation unit 106 to display the generated image.

As a result, for an image to be arranged on a map, an arrangement position where the correspondence with the shooting location of the image becomes clear can be calculated in accordance with the scale size. The map on which the image is arranged at the calculated arrangement position is presented to the user, solving the aforementioned problems.

In the above-described image arrangement position correction processing sequence, the new arrangement position of a thumbnail image on a map after a change of the scale size is calculated using equations (5) and (6). However, the practice of the present invention is not limited to this. According to the present invention, when the first arrangement position where an image is arranged on a map at the first scale size is set in advance, the image is arranged at the second arrangement position closer to the shooting location of the image than at a position corresponding to the first arrangement position on the map at the second scale size larger than the first scale size. According to the present invention, the image may be arranged at the third arrangement position farther from the shooting location of the image than at a position corresponding to the first arrangement position on the map at the third scale size smaller than the first scale size, as in the above-described image arrangement position correction processing.

At this time, the second arrangement position preferably exists on a straight line connecting the shooting location and the first arrangement position on the map at the second scale size, but the practice of the present invention is not limited to this. According to the present invention, when the scale size is changed to one different from the first scale size, the thumbnail image is arranged at a position where the correspondence between the shooting location and the thumbnail image on the map at the first scale size can be recognized even on the map at the second scale size. Thus, when a position not present on the straight line connecting the shooting location and the first arrangement position is determined as the second arrangement position, a transition to move the thumbnail image from the first arrangement position to the second arrangement position may be presented so that the user can recognize the correspondence with the thumbnail image on the map at a different scale size.

In the above description, when an arrangement position is not contained in the range of a displayed map, no thumbnail image is arranged. However, the practice of the present invention is not limited to this. For example, when a shooting location is not contained in the range of the displayed map but a new calculated arrangement position is contained in the range of the map, the thumbnail image may be arranged. When the shooting location is contained in the range of the map but a new calculated arrangement position is not contained in the range of the map, the thumbnail image may be displayed outside the map or in a dedicated region to notify the user that the thumbnail image exists outside the range of the map.

Figure 8A:
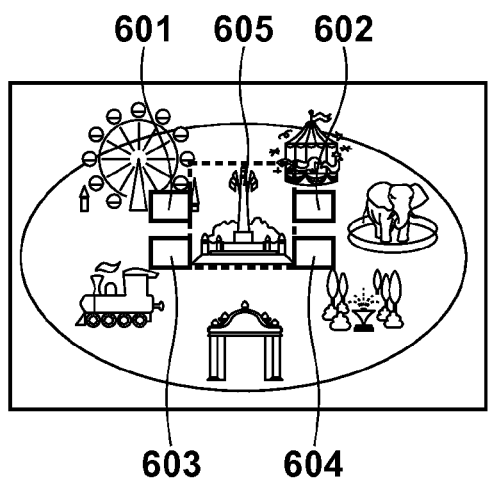
FIGS. 8A and 8B are views for explaining exceptional processing of the image arrangement position correction processing according to the embodiment of the present invention.
Figure 8B:
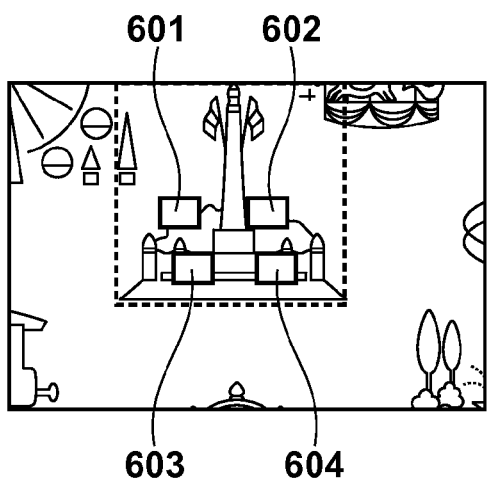

When a thumbnail image occludes the icon image (landmark image) of a landmark present at a shooting location upon a change of the scale size of a map, a threshold may be set for the display area of the icon image on the map to set whether to inhibit occlusion by the thumbnail image. For example, when the display area of the icon image of the tower 605 is equal to or smaller than the threshold, as shown in FIG. 8A, the arrangement position of a thumbnail image is changed outside the region of the icon image even if the arrangement position is on the icon image. To the contrary, when the display area of the icon image of the tower 605 is larger than the threshold, it is considered that the icon image can be recognized even if the thumbnail images 601 to 604 are arranged on the icon image. Hence, the thumbnail images may be arranged on the icon image, as shown in FIG. 8B. Note that the area used for determination may be set not only for the icon image of a landmark but also for a character string image (for example, place name) or map symbol, and the same processing may be executed depending on the area.

When the scale size of a map decreases, the arrangement position of a thumbnail image that is calculated for the map after the change of the scale size may be set at a position other than a dry land on the map. In this case, it may become difficult for the user to specify a shooting location corresponding to the thumbnail image arranged on the map. Thus, for example, the thumbnail image may be arranged at a preset arrangement position without changing the arrangement position, or may not be arranged. This control may be executed when a scale size smaller than a predetermined one is selected for a map or when a scale size smaller than one for which an arrangement position is set in advance is selected.

If an arrangement position at the first scale size is set in advance for an image to be arranged on a map, when scaling down the map, the arrangement position may be changed in the above-described way for a scale size falling within within a predetermined range from the first scale size, and may not be changed for a scale size outside the range. Alternatively, for a scale size outside the range, the image may be arranged at a position corresponding to the shooting location.

For example, when a country name or geographical feature attribute is set at a position on a map, and it is determined that the attribute of a position where a thumbnail image is arranged differs from the attribute of the shooting location, the thumbnail image may be arranged at the position of the shooting location. Alternatively, the thumbnail image may be arranged at a preset arrangement position or may not be arranged.

Also, various modifications below may be properly made. The user may individually select whether to change an arrangement position, instead of changing the arrangement positions of all thumbnail images to be arranged on a map upon a change of the scale size. When thumbnail images overlap each other after a change of the scale size, at least one of the arrangement position, aspect ratio, and thumbnail image size may be controlled so that the thumbnail images do not overlap each other. Alternatively, the user may set an overlapping order in advance when thumbnail images overlap each other.

In the description of the above embodiment, an arrangement position is set for one scale size, and a new arrangement position is calculated for a different scale size based on the set arrangement position. However, arrangement positions may be set for a plurality of scale sizes. More specifically, arrangement positions corresponding to a plurality of scale sizes are stored in the arrangement position information 205 of an image file. When a scale size for which no arrangement position has been set is set, a new arrangement position may be calculated using, as a reference, an arrangement position corresponding to a scale size closest to the set scale size. Alternatively, a new arrangement position may be calculated using interpolation or extrapolation from arrangement positions set at scale sizes before and after a scale size after the change.

Figure 9:
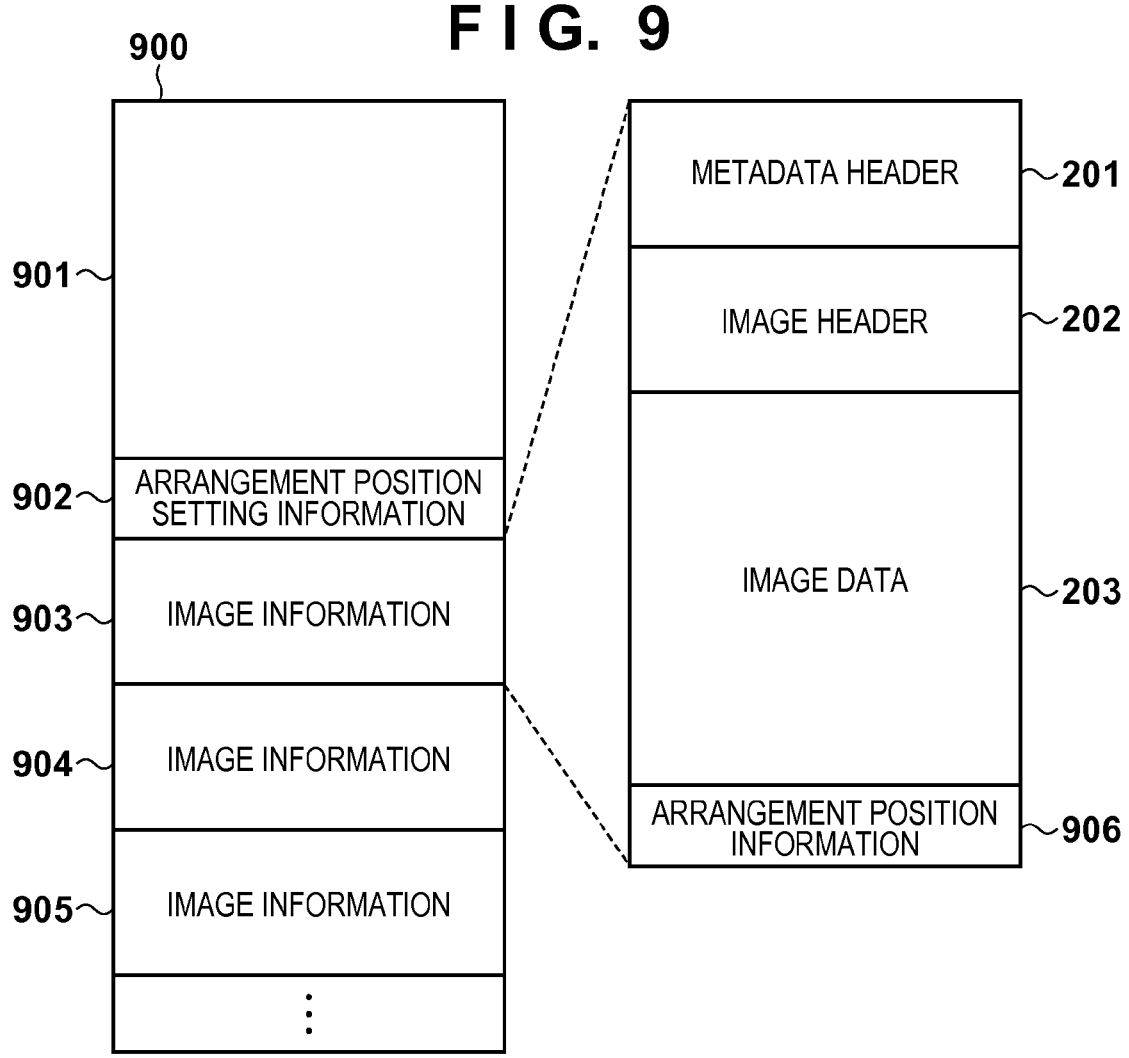
FIG. 9 is a view showing the file structure of a map file according to the embodiment of the present invention.

In the above description, the arrangement position information 205 is stored in the image file of an image to be arranged on a map. However, the arrangement position information 205 may be contained in a map recorded on the recording medium 104, as shown in FIG. 9. FIG. 9 shows the file structure of a map file 900 which is recorded on, for example, the recording medium 104 and used in the image arrangement position change application and map viewing application. In FIG. 9, information of the arrangement position of an image to be arranged on a map is described not in the form of the latitude and longitude but in the form of coordinates on the map.

The map file 900 contains map data 901, and pieces of image information 903 to 905 each corresponding to the image file 200 to be displayed on the map. The map file 900 also contains arrangement position setting information 902 including scale sizes at which arrangement positions have been set for the pieces of image information 903 to 905, and information of the latitude and longitude of the origin on the map. As shown in FIG. 9, each image information includes the metadata header 201, image header 202, and image data 203, similar to the image file. Further, the image information includes arrangement position information 906 representing coordinate information of each image data on a map at a set scale size. With this structure, the user can easily share the layout of a thumbnail image with another user.

As described above, the image processing apparatus according to the embodiment can provide a method of arranging an image at an appropriate position on a map in correspondence with a change of the scale size of the map. More specifically, the image processing apparatus determines a predetermined first arrangement position at the first scale size as the arrangement position of an image to be arranged on a map. At the second scale size larger than the first scale size, the image processing apparatus determines, as the arrangement position, the second arrangement position closer to the shooting location of the image than at a position corresponding to the first arrangement position on the map at the second scale size.

Even when a scale size different from one for which the arrangement position of an image to be arranged on a map has been set is set, the arrangement position is changed in consideration of the scale size. The user can easily grasp the correspondence between an arranged image and the shooting location of the image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-106621, filed May 11, 2011, which is hereby incorporated by reference herein in its entirety.

What is claimed is:

1. An image processing apparatus including a display unit configured to arrange and display, on a map, an image based on information of a shooting location of the image, where the image is associated with information of the shooting location and information of an arrangement position on the map which indicates a different position from the shooting location, comprising:
  a change unit configured to change a scale size of the map;
  a setting unit configured to set, in a case where the map is displayed at a first scale size, a first arrangement position as the information of the arrangement information of the image; and
  a determination unit configured to determine an arrangement position on the map, on which the image is arranged, based on a scale size at which the map is displayed, the information of the shooting location, and the information of the arrangement position,
  wherein as the arrangement position of the image, the determination unit determines, in a case where the change unit changes the scale size of the map from the first scale size to a second scale size larger than the first scale size, a second arrangement position closer to a shooting location of the image than at a position corresponding to the first arrangement position on the map at the second scale size, and wherein the second arrangement position is a point on a straight line connecting the shooting location and the position corresponding to the first arrangement position on the map at the second scale size.

2. The apparatus according to claim 1, wherein at a third scale size smaller than the first scale size, the determination unit determines, as the arrangement position of the image, a third arrangement position farther from the shooting location of the image than at a position corresponding to the first arrangement position on the map at the third scale size.

3. The apparatus according to claim 1, wherein at a scale size smaller than the first scale size, the determination unit determines, as the arrangement position of the image, a position corresponding to the first arrangement position on the map at the scale size.

4. The apparatus according to claim 1, wherein at a scale size smaller than the first scale size and smaller than a predetermined scale size, the determination unit determines, as the arrangement position of the image, a position corresponding to the first arrangement position on the map at the scale size.

5. The apparatus according to claim 2, wherein when an attribute set at the third arrangement position and an attribute set at the shooting location are different from each other on the map at the third scale size, the determination unit determines the first arrangement position as the arrangement position of the image.

6. The apparatus according to claim 1, wherein when the shooting location is not contained in a display region, the display unit does not arrange the image at the first arrangement position or the second arrangement position on the map, even though the first arrangement position and the second arrangement position are contained in a display region.

7. The apparatus according to claim 1, wherein when the arrangement position of the image that is determined by the determination unit is not contained in a display region, the display unit does not arrange the image on the map.

8. The apparatus according to claim 1, wherein when the arrangement position determined by the determination unit is not dry land on the map, the display unit does not arrange the image at the arrangement position on the map.

9. The apparatus according to claim 7, further comprising a notification unit configured to, when the display region contains the shooting location but does not contain the arrangement position of the image that is determined by the determination unit, notify that the image not to be displayed in the display region exists.

10. The apparatus according to claim 1, wherein when a display region of a landmark image, a character string image including a place name, or a map symbol present at the shooting location in the display region is not larger than a threshold, the determination unit determines the arrangement position of the image not to occlude the landmark image, the character string image, or the map symbol.

11. An image generation apparatus which generates an image to be arranged on a map in an image processing apparatus defined in claim 1, comprising:
  an addition unit configured to add, to an image, a shooting location of the image, a scale size of a map on which the image is arranged, and information of an arrangement position where the image is arranged.

12. A method of controlling an image generation apparatus which generates an image to be arranged on a map in an image processing apparatus defined in claim 1, comprising:
  adding, to an image, a shooting location of the image, a scale size of a map on which the image is arranged, and information of an arrangement position where the image is arranged.

13. A method of controlling an image processing apparatus including a display unit configured to arrange and display, on a map, an image based on information of a shooting location of the image, where the image is associated with information of the shooting location and information of an arrangement position on the map which indicates a different position from the shooting location, comprising:
  changing a scale size of the map;
  setting, in a case where the map is displayed at a first scale size, a first arrangement position as the information of the arrangement information of the image; and
  determining an arrangement position on the map, on which the image is arranged, based on a scale size at which the map is displayed, the information of the shooting location, and the information of the arrangement position,
  wherein, in a case where the scale size of the map is changed from the first scale size to a second scale size larger than the first scale size, determining a second arrangement position closer to a shooting location of the image than at a position corresponding to the first arrangement position on the map at the second scale size, and
  wherein the second arrangement position is a point on a straight line connecting the shooting location and the position corresponding to the first arrangement position on the map at the second scale size.

14. A non-transitory computer-readable recording medium recording a program for causing a computer to function as each unit of an image processing apparatus including a display unit configured to arrange and display, on a map, an image based on information of a shooting location of the image, where the image is associated with information of the shooting location and information of an arrangement position on the map which indicates a different position from the shooting location, the image processing apparatus comprising:
  a change unit configured to change a scale size of the map;
  a setting unit configured to set, in a case where the map is displayed at a first scale size, a first arrangement position as the information of the arrangement information of the image; and
  a determination unit configured to determine an arrangement position on the map, on which the image is arranged, based on a scale size at which the map is displayed, the information of the shooting location, and the information of the arrangement position, wherein as the arrangement position of the image, the determination unit determines, in a case where the change unit changes the scale size of the map from the first scale size to a second scale size larger than the first scale size, a second arrangement position closer to a shooting location of the image than at a position corresponding to the first arrangement position on the map at the second scale size, and wherein the second arrangement position is a point on a straight line connecting the shooting location and the position corresponding to the first arrangement position on the map at the second scale size.

* * * * *